United States Patent [19]

Imamura et al.

[11] Patent Number: 4,861,113
[45] Date of Patent: Aug. 29, 1989

[54] CAST WHEEL

[75] Inventors: Tadashi Imamura, Atsugi; Kazuyuki Shigaki, Toyohashi; Yuji Yamazaki; Tadashi Masuda, both of Toyokawa; Tsunemasa Okumura, Aichi, all of Japan

[73] Assignee: Topy Kogyo Kabushiki Kaisha, Tokyo, Japan

[21] Appl. No.: 160,189

[22] Filed: Feb. 25, 1988

[30] Foreign Application Priority Data

Feb. 25, 1987 [JP] Japan .............................. 62-27130[U]

[51] Int. Cl.4 .............................................. B60B 3/02
[52] U.S. Cl. .................................. 301/65; 301/63 R
[58] Field of Search ..................... 301/62, 63 R, 64 R, 301/65, 64 SD, 66, 67, 104; 29/159 R, 159.1

[56] References Cited

U.S. PATENT DOCUMENTS

| | | | |
|---|---|---|---|
| 1,858,663 | 5/1932 | Frank | 301/65 X |
| 1,974,534 | 9/1934 | Frank | 301/65 X |
| 2,130,881 | 9/1938 | Frank | 301/65 |
| 3,659,901 | 5/1972 | Porsche et al. | 301/65 |
| 4,165,131 | 8/1979 | Thompson | 301/65 |
| 4,420,190 | 12/1983 | Rohr | 301/65 X |
| 4,436,133 | 3/1984 | Rohr | 301/65 X |
| 4,482,189 | 11/1984 | Samuelson et al. | 301/65 X |
| 4,514,013 | 4/1985 | Woelfel et al. | 301/65 X |
| 4,533,184 | 8/1985 | Muller et al. | 301/65 X |

FOREIGN PATENT DOCUMENTS

| | | | |
|---|---|---|---|
| 60-78601 | 6/1985 | Japan . | |
| 132949 | 1/1902 | Switzerland | 301/65 |
| 383605 | 2/1931 | United Kingdom | 301/65 |
| 85/05328 | 12/1985 | World Int. Prop. O. | 301/65 |

OTHER PUBLICATIONS

*Principles of Metal Casting;* Richard Heine and Philip Rosenthal; 1955.

*Primary Examiner*—Russell D. Stormer
*Attorney, Agent, or Firm*—Birch, Stewart, Kolasch & Birch

[57] ABSTRACT

A full face type cast wheel, wherein a rim portion holding a tire and a disk portion connected to the rim portion are integrally cast, includes a side wall portion extending from a dropped portion of the rim portion to a bead seat portion of the rim portion and a plurality of recessed portions defined intermittently in the circumferential direction of the wheel on a surface of the side wall portion facing the inside of the tire. By formation of the recessed portions, the weight of the wheel can be decreased, generation of blowholes in a casting process can be prevented and air capacity of the tire can be increased.

10 Claims, 6 Drawing Sheets

CAST WHEEL

BACKGROUND OF THE INVENTION

1. Filed of the Invention

The present invention relates to a cast wheel for a vehicle, and more particularly relates to a wheel wherein a rim portion and a disk portion are integrally cast.

2. Description of the Prior Art

In the field of a wheel for a vehicle, a large number of so-called full face type wheels, which can obtain a good design of a disk by increasing the surface area of the disk, have been produced. Usually the full face type wheel is manufactured by casting a rim portion holding a tire and a disk portion integrally connected to the rim portion.

The conventional full face type cast wheel is constructed, for example, as shown in FIGS. 9 and 10. A wheel 1 is formed by integrally casting a rim portion 2 and a disk portion 7. Surface 7a of the disk portion 7 is continuously connected to one of the flange portions 6 of the rim portion 2.

In such a cast wheel, since the surface 7a of the disk portion 7 extends to the flange portion 6 of the rim portion 2 in the radial direction of the wheel with a substantially flat configuration, a portion 10 becomes thicker in the axial direction of the wheel in comparison with other types of wheels. This portion 10 is surrounded by the surface 7a, a wall surface 3a of a side wall portion 3 constituting a rising wall from a dropped portion 2a to a hump portion 4 of the rim portion 2, the hump portion 4, a bead seat portion 5 to which a bead portion of a tire is attached, and the inside surface of the rim portion. Thus, unnecessary cast metal tends to increase in the portion 10. This existence of the unnecessary metal is contrary to a requirement of lightening a wheel.

Disk portion 7 usually has a plurality of spoke portions 8 extending in the radial direction of the wheel. In the example shown in FIG. 9, the portions between adjacent decorative openings 9 are constituted as spoke portions. The existence of the unnecessary metal in the portion 10 as dissussed above causes blowholes (holes due to contraction) to be liable to occur in the spoke portions 8 during manufacture of the wheel. When the wheel 1 is cooled after the wheel is cast using molds, the portion 10 having unnecessary cast metal tends to draw cast metal which is not yet hardened from the portions surrounding the portion 10, especially from the spoke portions 8. This portion 10 draws unhardened metal because the contraction of the portion 10 is large as a result of the large volume of the portion 10 as compared with that of the surrounding portions. As a result, blowholes are liable to occur in the spoke portions 8. The blowholes in the spoke portions 8 decrease the strength of the spoke portions themselves and the strength of the connection between the rim portion 2 and the disk portion 7. This deteriorates product yield.

SUMMARY OF THE INVENTION

An object of the present invention is to provide a full face type cast wheel, which can lighten the wheel and can ensure a sufficient strength of connection between a rim portion and a disk portion by preventing blowholes from being generated during manufacture of the wheel, thereby increasing the product yield.

To accomplish the above object, a cast wheel according to the present invention, wherein a rim portion holding a tire and a disk portion connected to the rim portion are integrally cast, includes a side wall portion and a plurality of recessed portions defined on the side wall portion. The side wall portion constitutes a rising wall extending from a dropped portion of the rim portion to a bead seat portion of the rim portion to which a bead portion of the tire is attached. The recessed portions are defined intermittently in the circumferential direction of the wheel on a surface of the side wall portion facing the inside of the tire.

The recessed portions are disposed on the side wall portion desirably at positions corresponding to the positions of spoke portions in the circumferential direction of the wheel. The configuration of the recessed portions is not restricted to a specific shape. The shape of the recessed portions as viewed from the inside of the tire, may have various shapes, for instance, a fan-like or trapezoid-like configuration, triangular, circle or oval configuration, etc. Although the top portion of the side wall portion is usually formed as a hump portion humped higher than the bead seat portion in the radial direction of the wheel, in the case where the recessed portions extend to the position of a top surface of the hump portion in the radial direction of the wheel, it is desirable to form the recessed portions so as to leave at least a part of the hump portion, which is adjacent to the bead seat portion, over the entire length in the circumferential direction of the rim portion. The recessed portions may be formed by molds simultaneously with casting of the wheel or may be formed by cutting after casting. From the viewpoint of preventing blowholes from occurring during the casting process, the former forming method is more preferable than the latter method.

In such a cast wheel, the volume of the side wall portion is decreased by defining a plurality of recessed portions, and the weight of the wheel as a whole is also decreased. Since the recessed portions are disposed intermittently in the circumferential direction of the wheel, the left portions between adjacent recessed portions can sufficiently function as supporting walls extending from the dropped portion to the bead seat portion, thereby ensuring the necessary strength of the bead seat portion to which the bead portion of the tire is attached.

Since unnecessary metal is eliminated to a great extent from the side wall portion by defining the recessed portions, the total volume of this portion can be reduced to a small value. Accordingly, the contraction of this portion when the wheel is cooled after casting becomes small, the influence on other portions due to the contraction of this portion can be suppressed, and generation of blowholes can be effectively prevented. Particularly, in the case where the recessed portions are disposed at the positions corresponding to the positions of spoke portions, the undesirable influence on the spoke portions can be efficiently prevented. Therefore, the strength of the spoke portions themselves and the strength of the connecting portion between the rim portion and the disk portion can be ensured to be sufficiently strong. As a result, the product yield can also be increased.

Moreover, since the recessed portions are formed on the surface of the side wall portion facing the inside of the tire, the air capacity of the tire increases by the total capacity of the recessed portions. This causes resiliency of the tire in accordance with the cushioning function to increase and driving feeling of a vehicle to improve.

Futher scope of applicability of the present inveniton will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be become apparent and more readily appreciated from the following detailed description of the preferred exemplary embodiments of the invention, taken in conjunction with the accompanying drawings which are given by way of illustration only, and thus are not limitative of the present invention, and in which.

DETAILED DESCRIPTION OF THE PREFERRED EMBODIMENTS

The preferred embodiments of the present invention will be described hereunder referring to the attached drawings.

Figure 1:
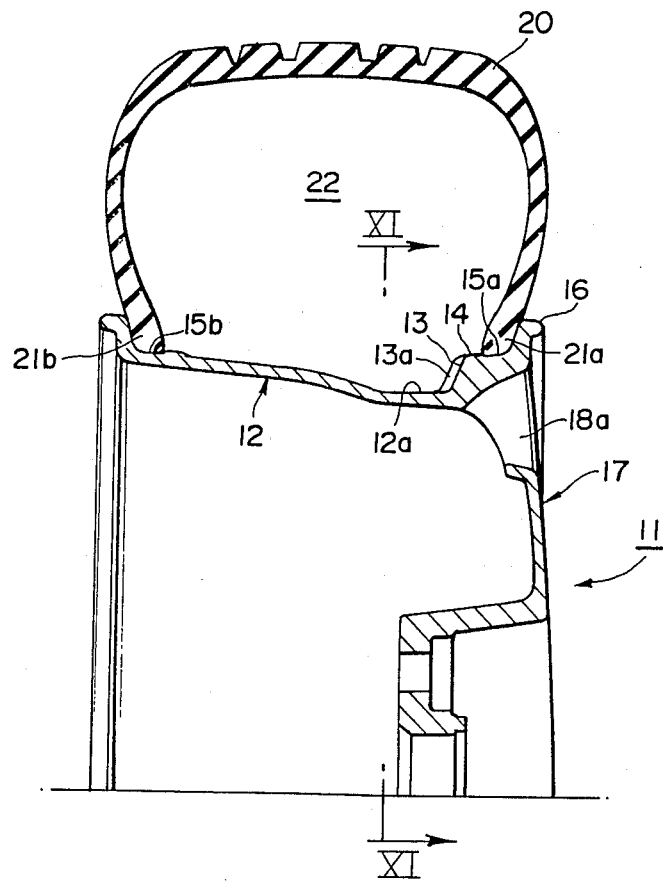
FIG. 1 is a sectional view of a cast wheel when a tire is attached to the wheel according to an embodiment of the present invention.
Figure 2:
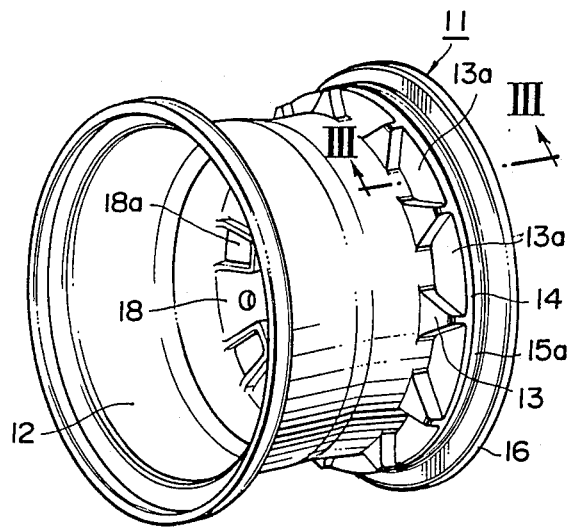
FIG. 2 is a perspective view of the wheel shown in FIG. 1.
Figure 3:
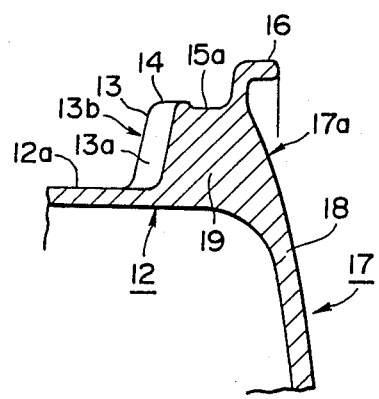
FIG. 3 is an enlarged partial sectional view of the wheel as viewed along III—III line shown in FIG. 2.

FIGS. 1-3 illustrate a cast wheel according to an embodiment of the present invention. A wheel 11 is manufactured by integrally casting a rim portion 12 to which a tire 20 is attached and a disk portion 17 connected to the rim portion. Surface 17a of the disk portion 17 is connected to a flange portion 16 positioned at one side portion of the rim portion 12. This connection is continuous in the radial direction of the wheel, thereby constituting a so-called full face type wheel.

On the outer surface of the rim portion 12 in the radial direction of the wheel, a dropped portion 12a is formed. Between the dropped portion 12a and the flange portion 16, a bead seat portion 15a is formed. This bead seat portion 15a is attached to the bead portion 21a of the tire 20. A side wall portion 13 constituting a rising wall extending from the dropped portion 12a to the bead seat portion 15a is provided as well as a hump portion 14 which is formed on the top portion of the side wall portion 13 and which is humped higher than the bead seat portion 15a in the radial direction of the wheel. The bead portion 21a of the tire 20 is attached to the bead seat portion 15a and another bead portion 21b is attached to another bead seat portion 15b. Air is charged into the inside 22 of the tire 20.

On a surface 13b of the side wall portion 13 facing the inside 22 of the tire 20, a plurality of recessed portions 13a are defined. The recessed portions are disposed intermittently in the circumferential direction of the wheel. In this embodiment, a plurality of decorated openings 18a are disposed on the disk portion 17 in the circumferential direction of the wheel. The portions between adjacent decorative openings constitute spoke portions 18. The recessed portions 13a are disposed on the side wall portion 13 at the positions corresponding to the positions of the spoke portions 18.

The recessed portions 13a are shaped in a fan-like configuration as viewed from the inside 22 of the tire 20. The recessed portions 13a are formed so as to extend from the position of the dropped portion 12a to the position of a top surface of the hump portion 14 in the radial direction of the wheel. In order to ensure stability of the attachment of the bead portion 21a of the tire 20 to the bead seat portion 15a, the recessed portion 13a are defined so as to leave at least a part of the hump portion 14, which is adjacent to the bead seat portion, over the entire circumference of the rim portion 12.

In such a cast wheel, since the cast metal corresponding to a plurality of recessed portions 13a is eliminated from the side wall portion 13, the weight of the wheel as a whole is decreased by the weight of the eliminated metal. Thus, lightening of the wheel can be achieved in comparison with a conventional cast wheel. Although the volume of the side wall portion 13 functioning as a supporting wall for the bead seat portion 15a is decreased by defining the recessed portions 13a, since the recessed portions are disposed intermittently in the circumferential direction, the left portions between adjacent recessed portions can sufficiently function as supporting walls for the bead seat portion. Therefore, the strength required for the bead seat portion 15a can be maintained, even if the weight of the wheel is decreased. By this decrease of the weight of the wheel, the fuel economy of the vehicle using this wheel can be improved.

Moreover, since the volume of a portion 19 connecting the rim portion 12 and the disk portion 17 becomes small by using the recessed portions 13a, the degree of contraction of the portion 19 when the wheel is cooled after casting becomes small. The influence due to the contraction of the portion 19 on other portions surrounding the poriton 19 is thereby suppressed and blowholes are prevented in the surrounding portions. Particularly, by disposing the recessed portions 13a at the positions corresponding to the positions of the spoke portions 18, generation of the blowholes in the sopke portions can be effectively prevented. As a result, enough strength of the spoke portions 18 can be ensured, and at the same time the strength of connection between the rim portion 12 and the disk portion 17 can be maintained to a sufficiently high value via the strengthened spoke portions 18.

From the viewpoint of preventing generation of the blowholes as described above, it is desirable that the recessed portions 13a are formed simultaneously with casting the whole of the wheel by using molds having molding portions with the same shapes as the recessed portions. However, in the case where porduction of the wheels is carried out with a small lot, conventional molds may be used and the recessed portions may be formed by cutting after casting. This method will be cheaper for the small lot production, as the case may be.

Furthermore, since the recessed protions 13a are defined on the surface 13b of the side wall portion 13 facing to the inside 22 of the tire 20, the capacity of the inside of the tire, that is, air capacity of the tire increases by the total capacity of the recessed portions. By this increase in the air capacity of the tire 20, resiliency of the tire during running of a vehicle using the wheel can be increased and the driving feeling can be improved.

The configuration of the recessed portions is not restricted to the above embodiment. Various configurations can be freely adopted as long as the strength of connection between the rim portion 12 and the disk portion 17 is maintained above a certain required level.

Figure 4:
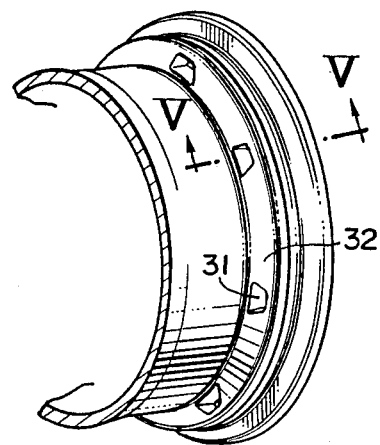
FIG. 4 is a partial perspective view of a cast wheel according to a second embodiment of the present invention.
Figure 5:
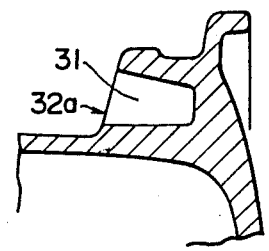
FIG. 5 is an enlarged partial sectional view of the wheel as viewed along V—V line shown in FIG. 4.

FIGS. 4 and 5 show another embodiment of a configuration of the recessed protions. Recessed portions 31 are defined on side wall portion 32 with a trapezoid-like configuration as viewed from the inside of the tire. As shown in FIG. 5, the recessed portions 31 are defined so that the sectional area of each of the recessed portions may become smaller as the recess becomes deeper in a direction away from surface 32a of the side wall portion 32. In such a configuration of the recessed portions 31, it is easy to take off the molds for the recessed portions from the recessed portions, and formation of the recessed portions can be done easily and smoothly.

Figure 6:
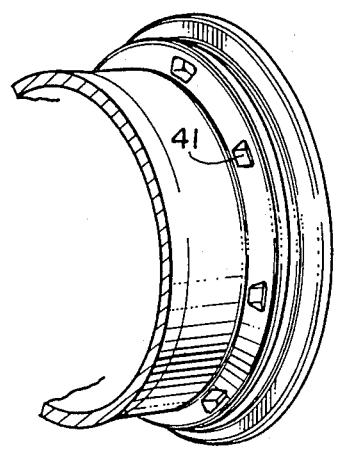
FIG. 6 is a partial perspective view of a cast wheel according to a third embodiment of the present invention.
Figure 7:
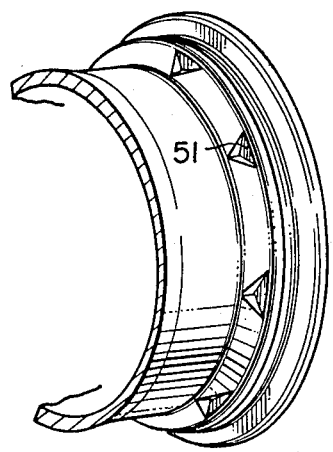
FIG. 7 is a partial perspective view of a cast wheel according to a fourth embodiment of the present invention.
Figure 8:
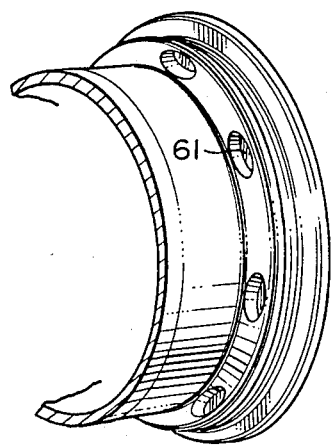
FIG. 8 is a partial perspective view of a cast wheel according to a fifth embodiment of the present invention.
Figure 9:
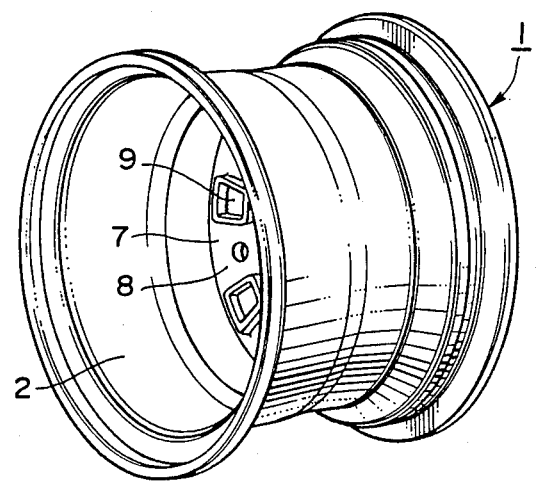
FIG. 9 is a perspective view of a conventional cast wheel.
Figure 10:
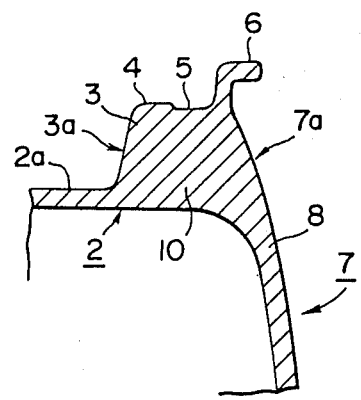
FIG. 10 is an enlarged partial sectional view of the wheel shown in FIG. 9.
Figure 11:
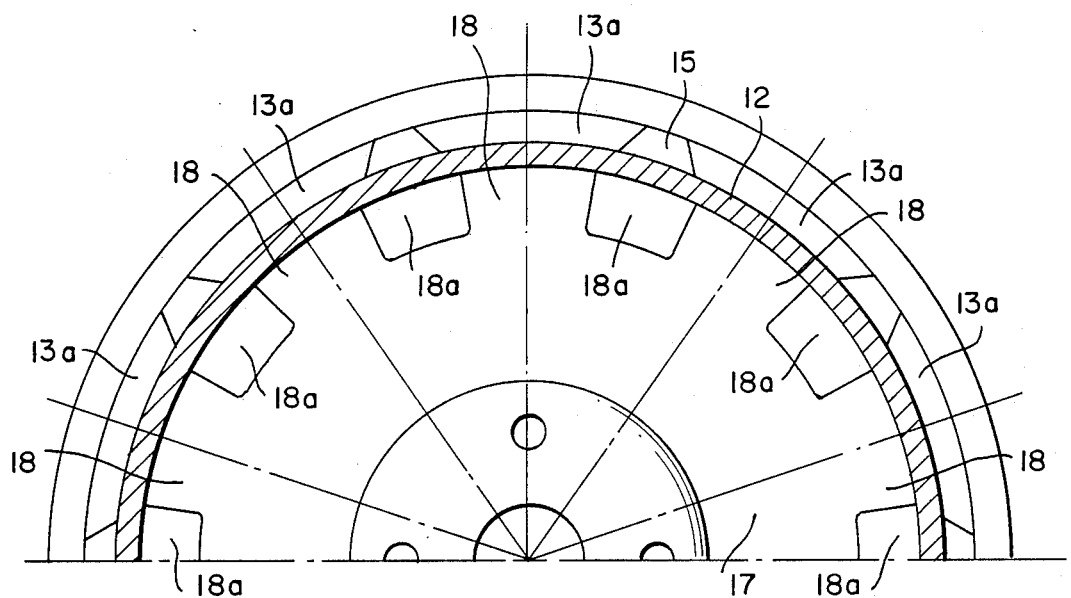
FIG. 11 is a sectional view taken along lines XI—XI of FIG. 1.

As shown in FIG. 6, recessed portions 41 may be shaped in a trapezoid-like configuration which is turned upside down in accordance with the upper side and lower side of the trapezoid shown in FIG. 4 in the radial direction of the wheel, as viewed from the inside of the tire. Moreover, as shown in FIG. 7, recessed portions 51 may be shaped in a triangular configuration as viewed from the inside of the tire. Furthermore, as shown in FIG. 8, recessed portions 61 may be shaped in an oval or a circle as viewed from the inside of the tire.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A wheel wherein a rim portion is integrally cast to a disk portion and wherein said rim portion is for holding a tire having a bead portion, comprising:

a bead seat portion for said rim portion, said bead seat portion receiving said bead portion of said tire;
   a dropped portion for said rim;
   a side wall portion extending between said bead seat portion and said dropped portion, said side wall portion extending around the rim portion in a circumferential direction of the wheel and having a surface facing the tire;
   a plurality of recessed portions defined in said side wall, said recessed portions being intermittently spaced in the circumferential direction on the surface of said side wall and said recessed portions acting to lighten the wheel and to aid prevention of blowholes during manufacture of the wheel;
   a plurality of decorative openings disposed on said disk portion in the circumferential direction of the wheel; and
   spoke portions disposed between said openings, said recessed portions being disposed on said side wall portion at positions corresponding to positions meeting said spoke portions, each of said spoke portions having a longitudinal axis, which radiates outwardly from the center of the wheel, and each of said recessed portions being aligned with one of said longitudinal axes such that said recessed portions are positioned on said axes.

2. The wheel of claim 1, wherein a top portion of said side wall portion is formed as a hump portion, said hump portion being formed higher than said bead seat portion in the radial direction of the wheel and said recessed portions extending to the top surface of said hump portion in the radial direction of the wheel.

3. The wheel of claim 2, wherein said recessed portions are defined leaving at least a part of said hump portion adjacent said bead seat portion over the entire circumference of said rim portion.

4. The wheel of claim 1, wherein a top portion of said side wall portion is formed as a hump portion, said hump portion being positioned higher than said bead seat portion in the radial direction of the wheel and said recessed portions in the side wall portion extend between a surface of said dropped portion and the top surface of said hump portion in the radial direction of the wheel.

5. The wheel of claim 1, wherein said recessed portions are shaped in a fan-like configuration.

6. The wheel of claim 1, wherein said recessed portions are shaped in a trapezoid-like configuration.

7. The wheel of claim 1, wherein said recessed portions are shaped in a triangular configuration.

8. The wheel of claim 1, wherein said recessed portions are shaped in one of a circle and an oval.

9. The wheel of claim 1, wherein said recessed portions are defined so that a sectional area of each of said recessed portions becomes smaller as the recessed portions become deeper.

10. The wheel of claim 1, wherein said recessed portions are formed by molds simultaneously with casting of said wheel.

* * * * *